Figure 1:
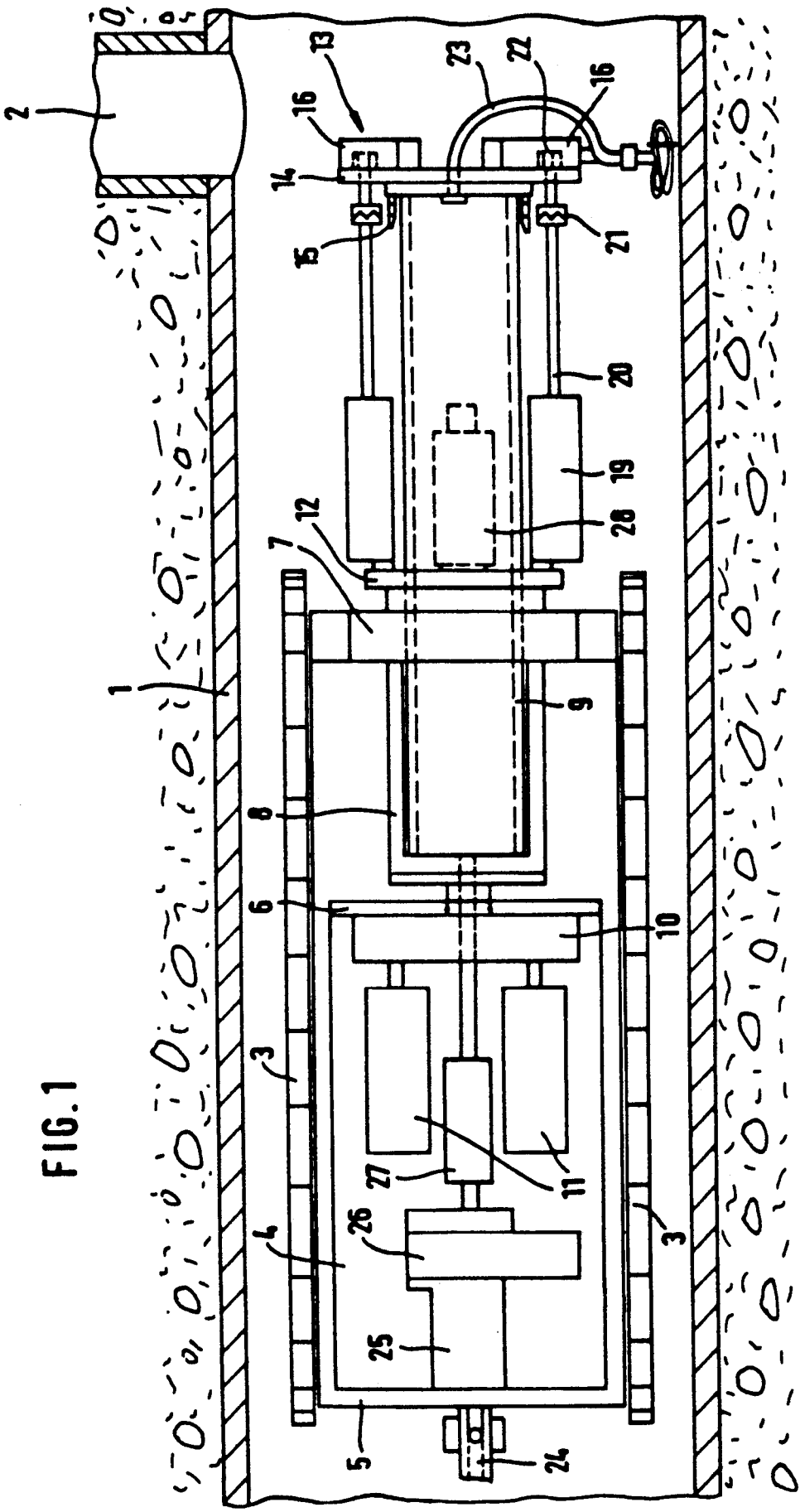

United States Patent [19]

Himmler

[11] Patent Number: 5,040,922

[45] Date of Patent: Aug. 20, 1991

[54] METHOD FOR REPAIRING AN INACCESSIBLE SEWAGE PIPE LEADING AWAY FROM A HOUSE USING A REMOTE-CONTROLLED APPARATUS OPERATING IN THE MAIN SEWAGE PIPE

[75] Inventor: Erich Himmler, Thalwil, Switzerland

[73] Assignee: Kunststoff-Technik Aktiengesellschaft Himmler, Zurich, Switzerland

[21] Appl. No.: 543,725

[22] PCT Filed: Nov. 14, 1989

[86] PCT No.: PCT/CH89/00199

§ 371 Date: Jun. 25, 1990

§ 102(e) Date: Jun. 25, 1990

[87] PCT Pub. No.: WO90/05874

PCT Pub. Date: May 31, 1990

[30] Foreign Application Priority Data

Nov. 21, 1988 [CH] Switzerland ............... 04304/88

[51] Int. Cl.⁵ ............... F16L 1/00; E02D 29/10
[52] U.S. Cl. ............... 405/155; 138/97; 405/154
[58] Field of Search ............... 405/154, 156, 157; 138/97; 156/156, 287, 294; 264/36

[56] References Cited

U.S. PATENT DOCUMENTS

| | | | |
|---|---|---|---|
| 3,710,812 | 1/1923 | Wise | 138/97 X |
| 3,950,461 | 4/1976 | Levens | 138/97 X |
| 4,245,970 | 1/1981 | St. Onge | 264/155 X |
| 4,428,204 | 1/1984 | Brister | 138/97 X |

Primary Examiner—Dennis L. Taylor
Attorney, Agent, or Firm—Ladas & Parry

[57] ABSTRACT

A device for repairing a main (1) can also be used to repair a leaking, corroded section of a branch pipe (2) which opens into the main. The device has a toothed rod (17) which can be extended approximately radially and rotated in the axis of the branch pipe by rotation of a pipe end cover plate (14). A hose (23), which extends from the center of the pipe end cover plate (14), is fastened to the free end of the toothed rod by means of a pipe piece (29). An air bubble (31) is placed on the pipe piece (29) and inflated by compressed air blown through the hose until it becomes lodged in the branch pipe itself. After the air bubble is detached, a cover plate is mounted on the end of the hose and a hardenable material is pumped through the hose into the cavity formed between the cover plate and the air bubble (31). If the branch pipe is to be brought into service again, the hardened material is drilled out of the branch pipe up to the diameter of the branch pipe (2) by the same or another device also operating in the main pipe (1).

10 Claims, 4 Drawing Sheets

METHOD FOR REPAIRING AN INACCESSIBLE SEWAGE PIPE LEADING AWAY FROM A HOUSE USING A REMOTE-CONTROLLED APPARATUS OPERATING IN THE MAIN SEWAGE PIPE

The invention refers to a method for repairing an inaccessible sewer pipe leading away from a house within that section with which it joins an equally inaccessible main pipe, the repair being carried out using a remote-controlled apparatus operating in that main pipe.

Pipes which must conduct sewage away from buildings and which here will be designated as house sewers, join, as a rule, a main sewage pipe running under a street or road passing by the building. These pipes as well as the main pipe are mostly of a diameter that prevents their passage by persons. Repairs can be effected by means of remote-controlled apparatus only which are known from numerous publications and avoid the necessity of excavating the entire pipe network and narrowing or even closing the street or road for traffic for a certain length of time. These apparatus, however, can only be used for repairing the main pipe.

The damages that occur on house sewers consist of leaks, real holes and even of a complete disappearance of the pipe in that particular section so that only the soil remains into which the house sewer originally was laid. Mostly that section can be found there where the respective house sewer joins the main pipe whereas further upstreams there is hardly any defect. By means of a television camera sent through the main pipe the damage can be localized, and its extent can be ascertained, particularly if the camera is equipped with a wide angle lens and/or is pivotally mounted so that even the house sewers are scanned by it. The repair of these damages is imperative because otherwise the sewage may reach the ground water.

A sealing becomes necessary, too, when the house sewer is no longer used. This is mostly the case when the original building is torn down and replaced by a new one. Rarely are house sewers of a new edifice positioned exactly on the same location as the previous pipes. But even if this happens, the old pipes cannot be used anymore, either because their diameter is too small or because they have numerous sharp bends in their course, and in particular if substantially corroded this adds to that decision. Therefore they not only must be closed but also sealed at their junction with the main pipe. If a house sewer is closed further upstream, sewage may penetrate from the main pipe into the soil if it cannot flow off in the main pipe. Because the main pipe is not necessarily excavated over the entire section for connecting the new house sewers to it but only at these junctions, it would be of advantage if the house sewers that are shut down could be sealed and closed by operating from the main pipe.

As already mentioned, it is known to repair the main pipe by means of a remote-controlled apparatus; one example out of many others are the method and the apparatus according to Swiss Pat. No. 640 623 and European Pat. No. 0 025 204. However, it is not known to use such main line repairing apparatus also for remote-controlled repair of the house sewage pipes and effecting this from the main pipe, i.e. with the apparatus remaining in the main pipe.

Thus a method is proposed which, according to the invention, is characterized by what is claimed in claim 1.

This method is so simple that, for carrying it out, the existing apparatus requires only minor modifications; it therefore can be used for the new application with only a few additional devices.

Figure 2:
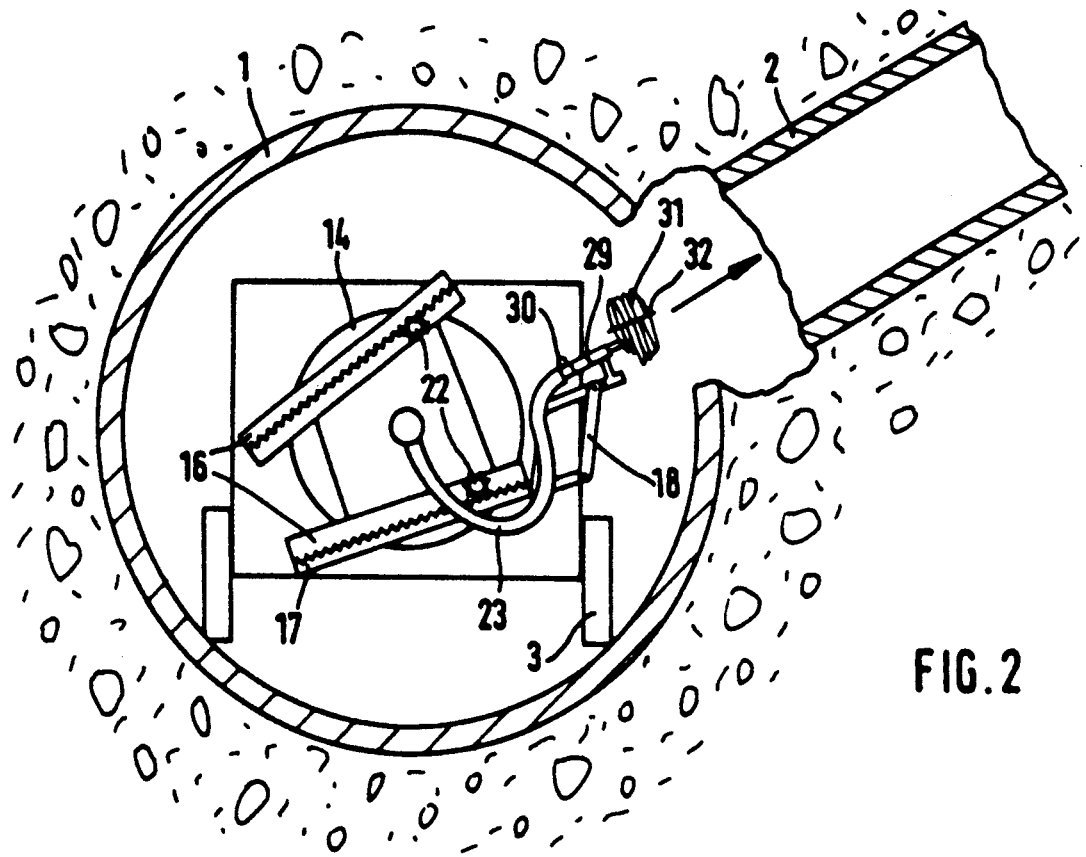
Figure 3:
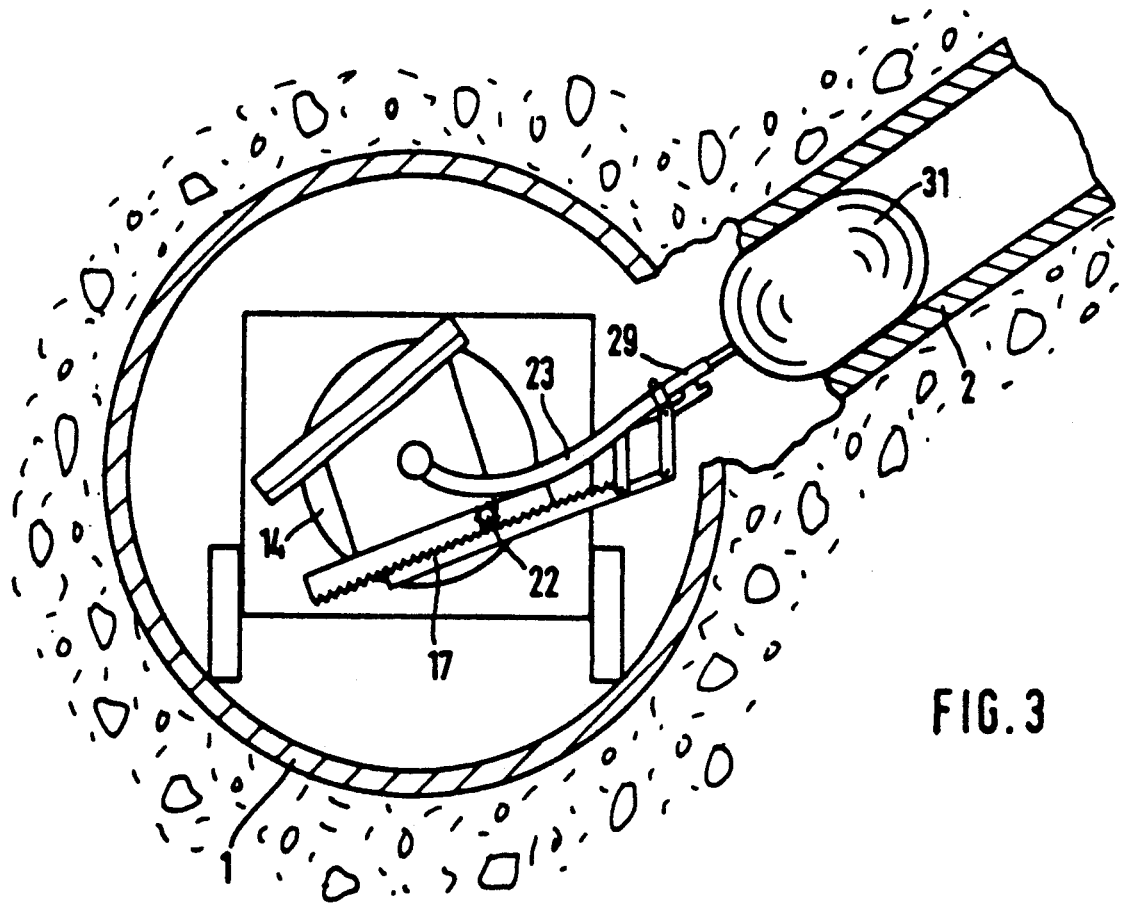
Figure 4:
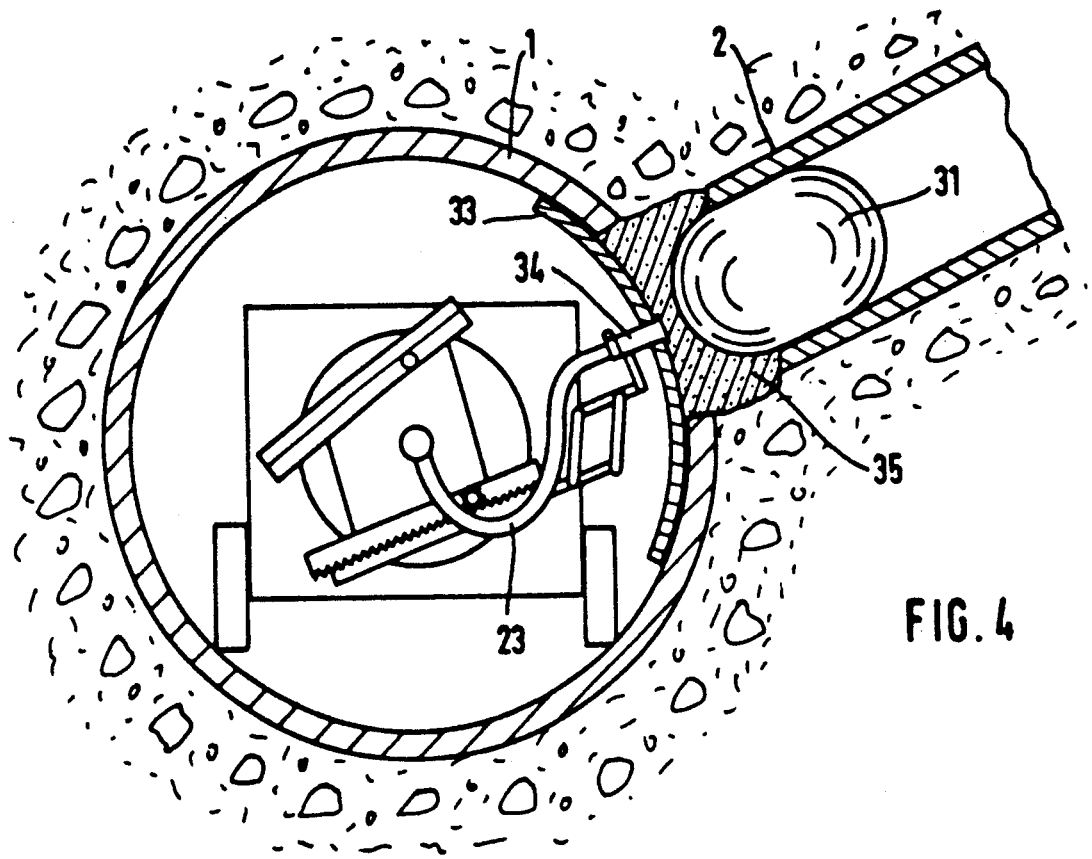
Figure 5:
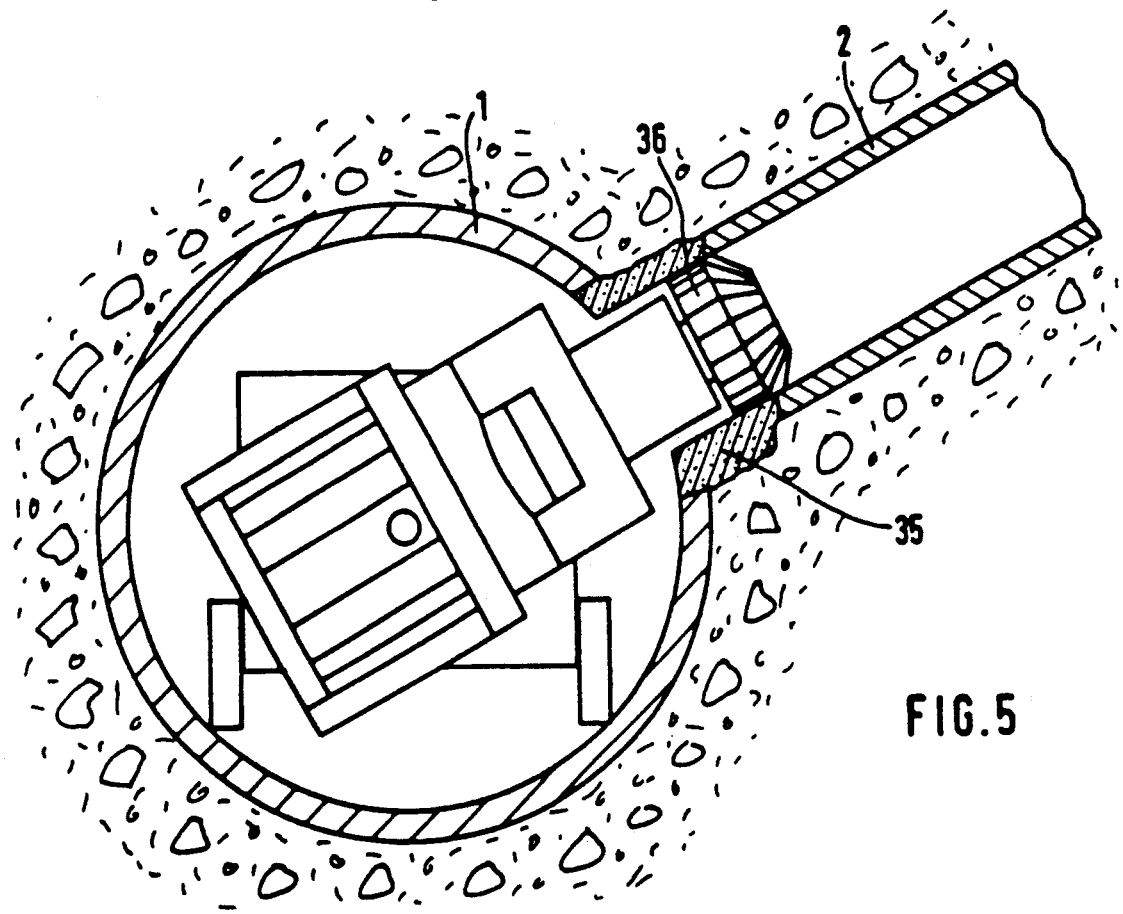
Figure 6:
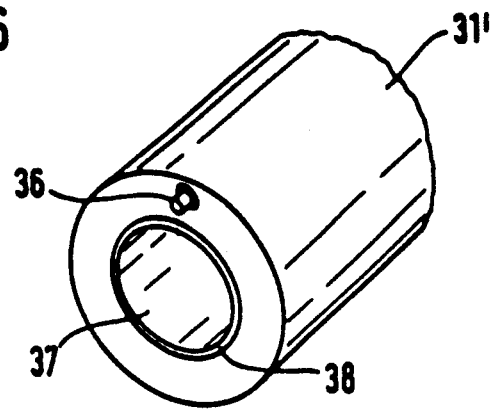
Figure 7:
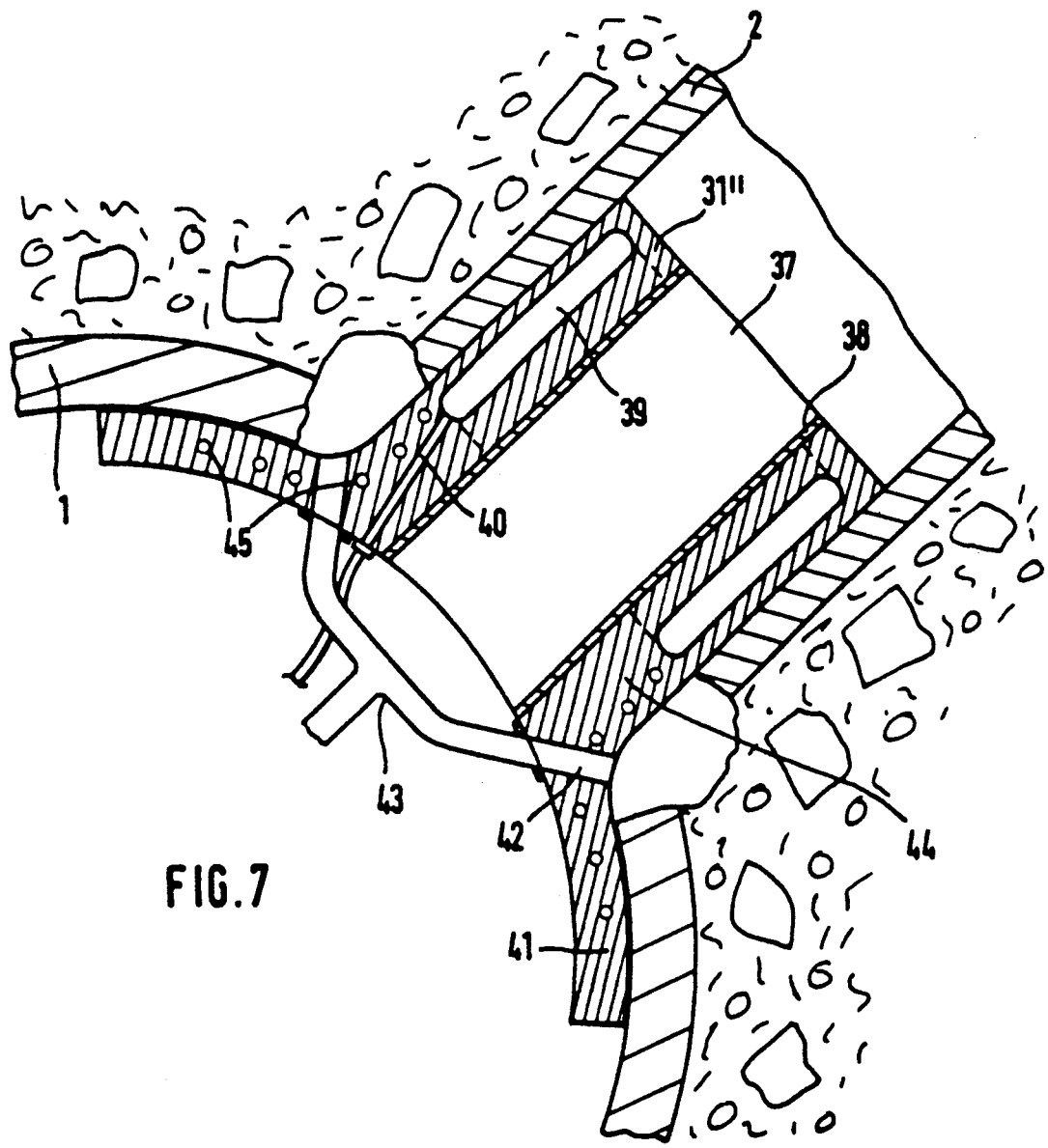

The method according to the invention shall now be explained, by way of example only, with reference to the accompanying drawings in which FIG. 1 illustrates a plan view of the apparatus used for carrying out the method, FIG. 2 shows the beginning of the method, FIG. 3 shows a first subsequent step, FIG. 4 illustrates the filling of the cavity at the site of the damage, FIG. 5 discloses a further facultative step, i.e. the boring of the material hardened in the cavity, FIG. 6 represents another embodiment of the air bag used in the method, and FIG. 7 still shows a further embodiment of said bag.

FIG. 1 represents a schematic plan view of the apparatus which in this embodiment corresponds to the one described in European patent specification No. 0 211 825. Therefore only those parts of that apparatus are depicted which are important for understanding the method to be described; for details reference is made to said specification. The apparatus, and this is one of the major advantages of the invention, requires only minor modifications for enabling it to repair not only main pipe 1 for which it was developed but also house sewer pipe 2 joining the main pipe. Both pipes are of a diameter that prevents any passage for persons. Therefore only a remote-controlled apparatus can be used which is introduced into main pipe 1 through a shaft that is large enough for a person to pass through it.

The apparatus is a motor-driven carriage which in the present embodiment runs on creeper chains; but standard wheels would equally suit. The chains 3 or wheels support a base plate 4 on which a vertical end wall 5, a bearing plate 6 and a large supporting bearing 7 are mounted. Supporting bearing 7 serves for supporting a hollow cylinder 8 which over a fraction of its length has a recess of such dimensions that it is reduced to an open trough or half shell. This hollow cylinder 8 is supported rotatably within bearing 7 and serves for taking up a tube 9 which is introduced into hollow cylinder 8 from the right end in FIG. 1 and is releasably attached to it by known locking devices not represented. Hollow cylinder 8 is connected across bearing plate 6 to a gear 10 driven by two motors 11 arranged in parallel position to each other. When the motors operate, not only hollow cylinder 8 rotates but also a flange 12 on that end of hollow cylinder 8 through which tube 9 is inserted. On the right end of tube 9 in FIG. 1 a device 13 is mounted that previously served for supplying a mastic or the like to main pipe 1 and for spreading it over its interior wall but now is slightly modified for the new application. This device comprises a tube closing cover 14, as before, which can be attached to tube 9 by means of easily releasable locks of known design and therefore represented only schematically. This tube closing cover 14 carries two rigid guides 16 for two displaceable racks 17, as can best be seen from FIGS. 2 to 4. These racks that can be displaced nearly radially are equipped on their ends with each a parallelogramm link 18. The free end of each link was intended to support a tool mounted on it. Originally the links served for carrying the tools across noncircular spots in the main pipe, i.e. to equalize such deviations from the circular cross section. For the present application they are not necessary. The displacement of racks 17 is effected by means of electric motors 19 mounted to flange 12 which operate the racks by means of shafts 20 and each a claw clutch 21 and a pinion 22 (FIG. 2). Clutches 21 are essential in order to be able to remove entire device 13 from tube 9 and to reset it again, because tube 9 contains the mastic; if the latter is exhausted, empty tube 9 must be replaced by a full one. Normally this material is supplied through a flexible hose 23, attached with its one end to the center of cover 14, to a spatula mounted on one end of one of the racks. This transport of material is effected by means of pressurized air supplied from the left end of the carriage through a hose 24, a connecting block 25, a control valve 26 and a rotational bushing 27 into tube 9. The rotational bushing 27 is necessary because control valve 26 is rigidly mounted but hollow cylinder 8 and tube 9 are rotatable, and with them device 13 rotates, too.

With this description of the device, it is now easier to explain the inventive method, by referring to FIGS. 2 to 5. The carriage is brought, within main pipe 1, to the junction with house sewer 2 to be repaired. This positioning poses no problem, thanks to a television camera 28 mounted on the carriage, on flange 12 below tube 9 (FIG. 1). When flange 12 rotates, camera 28 moves on a circular path about the longitudinal axis of tube 9 so that the junction becomes visible and can be studied in detail. Hose 23 is now pushed with its one free end over a short pipe 29 and fixed with a hose clamp 30. Pipe 29 is mounted on the end of the respective parallelogramm link 18, and over the end of pipe 29 the inlet of an air bag 31 is pushed. This air bag is initially folded so that it does not hamper the displacement of the carriage, and the folded sections are held together by means of a thin rubber band as used in the office or household. When motors 11 are switched on, entire device 13 is rotated so far that subsequently the one particular rack 17 can be advanced exactly within the longitudinal axis of house sewer 2 by means of that motor 19 and pinion 22 that are attributed to this rack. When air bag 31 has reached its proper position as illustrated in FIG. 3, it will become inflated by means of the compressed air system of the carriage, i.e. with air from hose 24 via tube 29. The rubber band which is selected so as to be unable to withstand such an extension, is torn apart. Air bag 31 is inflated until it fully contacts the interior wall of sewage pipe 2. By doing so, it becomes anchored on the relatively coarse interior wall to such an extent that it is torn off from pipe 29 during the subsequent return of rack 17. A check valve within air bag 31 prevents the air from escaping from the now separated air bag.

How the procedure now continues, is illustrated in FIG. 4. Rack 17 is withdrawn, and the entire carriage is returned within main pipe 1 to the service shaft. There a shield 33 is placed onto the end of parallelogramm link 18. It comprises a tubular passage 34 so that hose 23 can be attached to it. During this mounting tube 9 is filled with mastic, too. The carriage now proceeds again to the junction with house sewer 2, and shield 33 is placed over the mouth of sewer 2. When the compressed-air supply is switched on, the mastic (either epoxy or a cement-like material) is pressed through hose 23 and tubular passage 34 and into the cavity defined by air bag 31, shield 33 and the soil around that section of sewer 2 that has disappeared due to total corrosion. This cavity is now filled. After the material has hardenend, it forms a solid closure 35 which only requires a relatively small quantity of material due to air bag 31 located in sewer 2. Without air bag 31, much more material would have been required, which furthermore, on account of the missing support formed by air bag 31, would have been considerably less dense and therefore also less solid.

If the original intention was to shut down house sewer 2, the work is now terminated. Even before the material has fully hardened, the other rack, not used so far, can be operated for moving a spatula which exists already on the original apparatus, over the material, smoothing the latter. Prior to this, of course, shield 33 must be removed. The movement of the spatula is amply described in European patent specification No. 0 211 825 already mentioned. Air bag 31 remains confined.

If, however, sewer 2 must remain in service, closure 35 must be opened by providing a bore through it, as can be taken from FIG. 5. The device described above is now replaced by a device having a drill or milling head 36 which can be advanced radially. Such tools are known per se; one of them is described in European patent specification No. 0 025 204, another one in International Publication WO/7154. If the apparatus is already designed for boring and the spreading of mastic as in the first one of these specifications, only shield 33 has to be removed. Closure 35 therefore is bored open to the diameter of house sewer 2, this operating starting from main pipe 1. Air bag 31 is destroyed when the boring tool pushes through closure 35; its remains are subsequently flushed into main pipe 1 and from there away by the water circulating again in sewer 2.

On this method it is essential that the soil which was exposed without any protection due to the usually extensive and often total corrosion is now sealed again, and this in the step according to FIG. 4 as well as to FIG. 5. Thus any penetration of sewage into the groundwater is prevented. As already mentioned, sewage may also penetrate from main pipe 1 if the latter is charged up to its capacity.

If for any reason it is important that the sewage should continuously flow from house sewer 2 into main pipe 1 during the entire sealing procedure, an air bag according to FIG. 6 is used. Designated with reference numeral 31', it forms a hollow cylinder in its inflated state. Its inlet 36 therefore is of course no longer exactly in the longitudinal axis of house sewer 2 but excentrically to it, a fact that must be taken into consideration when positioning air bag 31' in house sewer 2. Shield 33 must now have an opening for the passage of the sewage that is concentric to the central passage 37 of air bag 31' whereas tubular passage 34 for the mastic must be positioned excentrically. Air bag 31' must be introduced into house sewer 2 into such a position that it abuts against shield 33. Only in this manner no mastic material injected into the cavity can reach central passage 37 of air bag 31'. It is true that sewage from sewer 2 partly flows over the apparatus, but the latter is anyway designed for such a state and can operate even when main pipe 1 is halfway filled with water. Air bag 31' has on the inside that faces central passage 37 a stiffener 38 which consists of a harder material than the one of the air bag. This stiffener prevents the air bag from expanding too much towards the inside when contacting house sewer 2 since such an expansion would unduly narrow down central passage 37.

The tubular form of the air bag may further be modified as illustrated in FIG. 7. Clearly visible is an annular air chamber 39 that is connected to a source of compressed air and an air release valve (not shown) by way of a conduit 40 in order to fill or empty the air bag. Air bag 31" has on its one end a flange 41 which now operates the same way as did shield 33. Several bores 42 two of which are illustrated extend through this flange and are connected to a rigid T-shaped conduit 43 which simultaneously carries flange 41 and with it air bag 31", besides its main function as feeder for the mastic material. Preferably heating wires 45 are provided in flange 41 and in adjacent zone 44 that forms a transition to air bag 31". With these wires curing of the material injected into the location to be repaired can be considerably shortened, in particular if the material is a two-component epoxy resin of polyurethane. A rapid hardening is thus possible; the unwanted cooling effect of the water flowing all the time through central passage 37 into main pipe 1 can be compensated for in this manner.

In all figures showing house sewer 2 the latter is represented as joining the main pipe exactly radially, i.e. perpendicular to a tangent to the main pipe. However, this is not always the case; deviations from this 90 degree standard occur, too. Since, on the other hand, these angles of deviation are mostly indentical to each other or at least of a standard nominal value, only a few items on which air bag 31" rests in an inclined position on flange 41 are needed. Because air bag and flange are of the same elastic material, even deviations from said nominal value can be taken up without a loss of sealing quality.

The method represented here furthermore has the advantage that the already repaired and newly bored house sewer (FIG. 5) can be shut down later on at any time, by again inserting a closure according to FIG. 4 but without boring a passage through it. In this way even mistakes in selecting the proper house sewer, something that occasionally happens, can be corrected without any problems.

I claim:

1. A method of filling a sewage pipe connected to a main pipe line, said method comprising:
   attaching an inflatable body to a known remote control sewage device having the means for conducting compressed fluid, said body being attached such that said fluid can be conducted to said body, said body being rotatably attached to said device and attached such that it can extend radially from said device;
   introducing said device and said body into said main pipeline until said body is generally opposite the point of joinder between said main pipeline and said sewage pipe;
   pivoting and radially extending at least a portion of said inflatable body into said sewage pipe;
   inflating said body until it contacts said sewage pipe;
   placing a cover over the junction between said sewage pipe and said main pipe such that said cover is between said inflated body and the interior of said main pipe; and
   filling the area between said cover and said body with hardening material.

2. The method of claim 1 wherein said inflatable body is a self-sealing air bag attached to said means for conducting compressed fluid and wherein said cover is in the form of a shield adapted to the diameter of said main pipe, said method further comprising the step of withdrawing said means for conducting compressed fluid from said air bag after said inflating step.

3. The method of claim 2 wherein said means for conducting compressed fluid comprises a pipe section that is radially movable and wherein said air bag is connected to said radially movable pipe section.

4. The method of claim 1 further comprising the steps of removing said cover after said hardening material has hardened; and
   boring a hole through said hardened material and said air bag into said sewage line to render said sewage line open and in communication with said main line.

5. The method of claim 4 further comprising the steps of removing said cover after said hardening material has hardened; and
   boring a hole through said hardened material and said air bag into said sewage line to render said sewage line open and in communication with said main line.

6. The method of claim 4 wherein the hardened material is bored to the diameter of the original sewage pipe by means of a drilling head brought to the sight of the junction between the sewage pipe and the main line on said known remote control sewage device.

7. The method of claim 5 wherein the hardened material is bored to the diameter of the original sewage pipe by means of a drilling head brought to the sight of the junction between the sewage pipe and the main line by means of said known remote control sewage device.

8. The method of claim 1 wherein said inflatable body is an elastic tubular section having a central bore surrounded by an annular air chamber.

9. A method of filling a sewage pipe connected to a main pipe line, said method comprising:
   attaching an inflatable body to a known remote control sewage device having the means for conducting compressed fluid, said body being attached such that said fluid can be conducted to said body, said body being rotatably attached to said device and attached such that it can extend radially from said device;
   introducing said device and said body into said main pipeline until said body is generally opposite the point of joinder between said main pipeline and said sewage pipe;
   pivoting and radially extending at least a portion of said inflatable body into said sewage pipe;
   inflating said body until it contacts said sewage pipe, said body having a flange which extends along a potion of the inside diameter of said main pipe to the junction between said main pipe and said sewage pipe;
   filling the area between said body and said sewage pipe with 10. The method of claim 9 wherein said inflatable body is an elastic tube section having a central bore surrounded by an annular air chamber.

* * * * *